(12) United States Patent
Gow

(10) Patent No.: US 10,395,569 B2
(45) Date of Patent: Aug. 27, 2019

(54) LIGHT FIXTURE SIGN

(71) Applicant: Thomas W. Gow, Lake Preston, SD (US)

(72) Inventor: Thomas W. Gow, Lake Preston, SD (US)

(*) Notice: Subject to any disclaimer, the term of this patent is extended or adjusted under 35 U.S.C. 154(b) by 0 days.

(21) Appl. No.: 16/031,292

(22) Filed: Jul. 10, 2018

(65) Prior Publication Data

US 2018/0330642 A1     Nov. 15, 2018

Related U.S. Application Data

(62) Division of application No. 15/356,829, filed on Nov. 21, 2016, now Pat. No. 10,049,604.

(51) Int. Cl.
| | |
|---|---|
| *G09F 13/00* | (2006.01) |
| *F21V 8/00* | (2006.01) |
| *G09F 13/08* | (2006.01) |
| *G09F 13/22* | (2006.01) |
| *F21V 3/06* | (2018.01) |
| *F21Y 115/10* | (2016.01) |
| *G09F 13/04* | (2006.01) |

(52) U.S. Cl.
CPC .............. *G09F 13/00* (2013.01); *F21V 3/062* (2018.02); *G02B 6/0005* (2013.01); *G09F 13/08* (2013.01); *G09F 13/22* (2013.01); *F21Y 2115/10* (2016.08); *G09F 2013/0459* (2013.01); *G09F 2013/222* (2013.01)

(58) Field of Classification Search
CPC .. G09F 13/00; G09F 13/06; G09F 2013/0459; G09F 2013/222
See application file for complete search history.

(56) References Cited

U.S. PATENT DOCUMENTS

| | | | | |
|---|---|---|---|---|
| 1,505,625 A | * | 8/1924 | Dearth | G09F 19/22 40/565 |
| 1,518,708 A | * | 12/1924 | Smith | G09F 13/06 220/3.8 |
| 1,709,202 A | * | 4/1929 | Beldin | G09F 13/04 174/50 |
| 2,225,961 A | * | 12/1940 | Rundberg | G09F 13/06 362/235 |
| 3,136,083 A | * | 6/1964 | Guth, Jr. | G09F 13/04 220/3.94 |
| 4,848,017 A | * | 7/1989 | Bailey | G09F 7/10 40/576 |
| 5,025,349 A | | 6/1991 | Gow | |
| 5,267,404 A | * | 12/1993 | Kizy | G09F 13/26 40/545 |
| 5,390,090 A | * | 2/1995 | Nau | F21S 8/022 362/145 |

(Continued)

*Primary Examiner* — Gary C Hoge

(74) *Attorney, Agent, or Firm* — Dicke, Billig & Czaja, PLLC

(57) ABSTRACT

A concealed light fixture sign includes a flange having stencil openings formed therein that define a message. A container extends from a rear surface of the flange and provides light through the stencil openings. The container is configured to be installed completely within a recess behind a mounting surface with the flange positioned substantially flush with the mounting surface. Translucent inserts positioned within the stencil openings are removable to provide access to an interior of the container after installation of the light fixture sign.

7 Claims, 15 Drawing Sheets

(56) References Cited

U.S. PATENT DOCUMENTS

| | | | |
|---|---|---|---|
| 5,953,842 A * | 9/1999 | Bodell | G09F 13/04 |
| | | | 40/570 |
| 6,097,279 A | 8/2000 | Gow | |
| 6,658,774 B1 * | 12/2003 | Munter | G09F 13/04 |
| | | | 362/235 |
| 6,763,624 B2 | 7/2004 | Gow | |
| 6,976,765 B2 * | 12/2005 | Helenowski | F21S 8/024 |
| | | | 362/147 |
| 7,314,094 B2 | 1/2008 | Gow et al. | |
| 8,217,264 B2 | 7/2012 | Gow | |
| 8,469,556 B2 | 6/2013 | Gow | |
| 8,471,407 B2 | 6/2013 | Gow et al. | |
| 2006/0213099 A1 * | 9/2006 | Vazquez | G09F 13/06 |
| | | | 40/574 |
| 2016/0163240 A1 * | 6/2016 | Brunelli | F21V 15/01 |
| | | | 40/564 |

* cited by examiner

LIGHT FIXTURE SIGN

CROSS-REFERENCE TO RELATED APPLICATIONS

This application is a divisional of U.S. application Ser. No. 15/356,829, filed Nov. 21, 2016, now allowed, the entire teachings of which are incorporated herein by reference.

BACKGROUND

Building codes require that public spaces have electrically operated emergency lighting and signage in case of a power outage so that the occupants of the building can evacuate safely. Such emergency lighting and signage may involve an auxiliary power source that functions during a power outage. There are a variety of light fixture exit signs used in buildings to provide emergency exit notifications. These exit signs are made of a variety of materials, including various metals and plastics, which are mounted on a building ceiling or wall. The United States nationally requires exit signs to indicate the word "EXIT", and the exit signs may also include directional arrows (e.g., right arrow, left arrow, both right and left arrows). All exit signage letters and arrows are Code required to be illuminated. Canada and other countries throughout the United Kingdom require that the exit signs use a standardized "running man" symbol along with arrows showing direction. A projected "Exit" message may be obtained by directing light from a light source through an image forming apparatus, such as a stencil. These exit signs are produced in many different directional arrow configurations that require excessive production of various configurations and can result in potential mistakes in shipping.

Existing light fixture signs are typically mounted in some exposed location and are subject to accidental damage, intentional vandalism, collection of dirt and grime, and in many cases are not aesthetically pleasing to look at. Because of their general exposure, light fixture signs are vulnerable to breakage of, or tampering with, the light itself, with possible resultant battery pack disconnecting or draining of the stored power. The result of either would be an unanticipated absence of emergency lighting during an outage of normal power. Additionally, many light fixture signs do not have an aesthetically pleasing appearance. When thousands of dollars have been spent to establish a pleasing decor in an office, lobby, etc., the appearance of such a sign can be glaringly out of place.

SUMMARY

One embodiment is directed to a concealed light fixture sign. The light fixture sign includes a flange having stencil openings formed therein that define a message. A container extends from a rear surface of the flange and provides light through the stencil openings. The container is configured to be installed completely within a recess behind a mounting surface with the flange positioned substantially flush with the mounting surface. Translucent inserts positioned within the stencil openings are removable to provide access to an interior of the container after installation of the light fixture sign.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Embodiments disclosed herein are directed to an aesthetically-pleasing, easy-to-install, vandal-resistant, concealed, light fixture sign. Embodiments of the light fixture sign may be used in new construction, and may also be readily used in remodeling or in retrofit circumstances to provide an aesthetically pleasing sign that can be mounted flush and concealed in a wall, or mounted on a ceiling. Some embodiments are directed to a field-modifiable light fixture sign that is adaptable to any configuration, such as an appropriate directional arrow configuration for a given installation. The light fixture sign according to some embodiments may be concealed completely within a wall or ceiling and still provide the required information.

Figure 1:
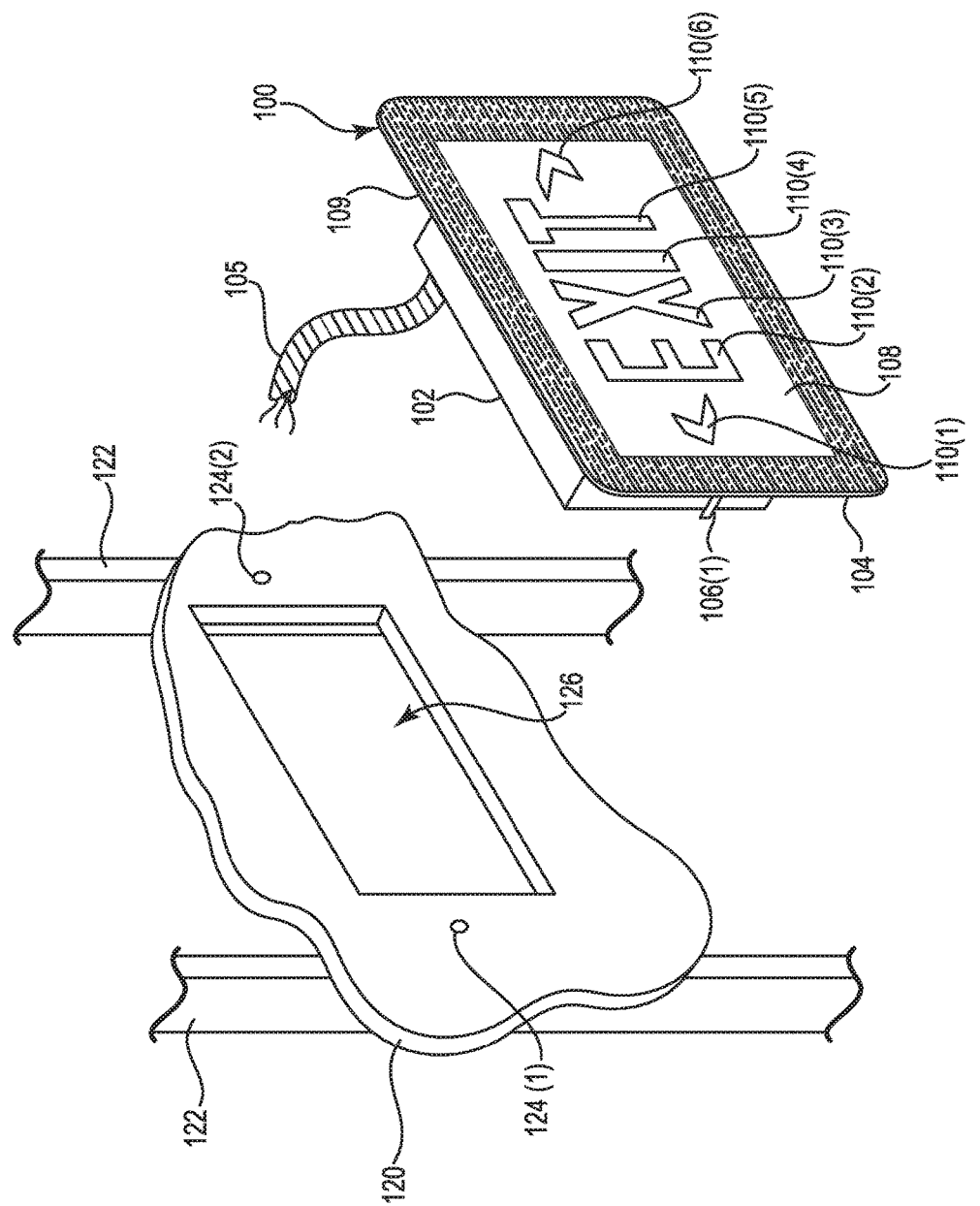
FIG. 1 is a diagram illustrating a perspective view of a light fixture sign prior to installation in a wall according to one embodiment.
Figure 2:
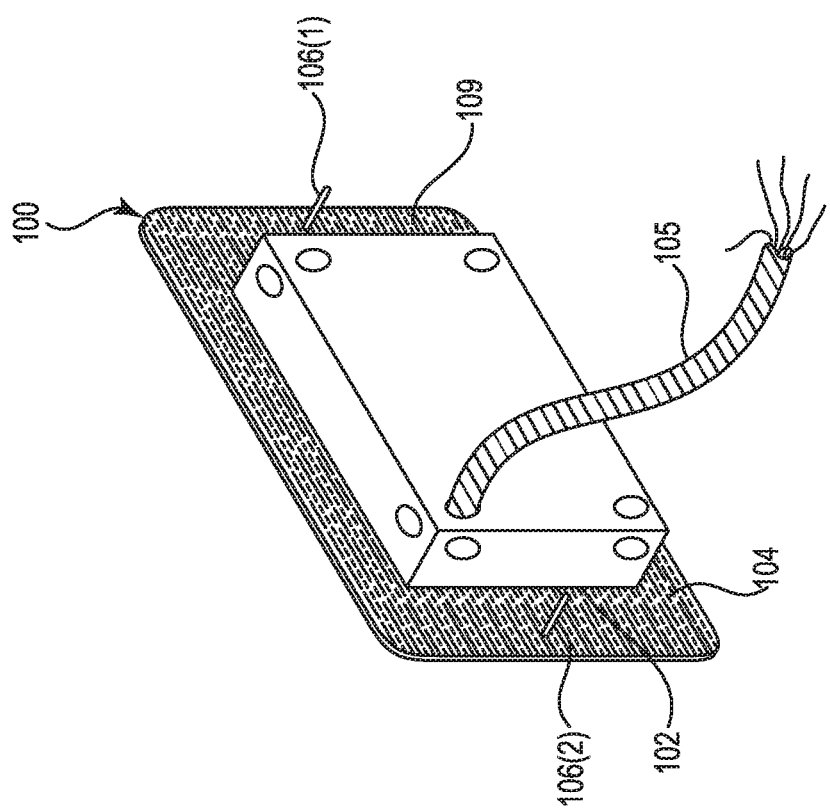
FIG. 2 is a diagram illustrating a perspective view of a rear side of the light fixture sign shown in FIG. 1 according to one embodiment.

FIG. 1 is a diagram illustrating a perspective view of a light fixture sign 100 prior to installation in a wall 120 according to one embodiment. FIG. 2 is a diagram illustrating a perspective view of a rear side of the light fixture sign 100 shown in FIG. 1 according to one embodiment. In the illustrated embodiment, the light fixture sign 100 is a light fixture exit sign. In other embodiments, the light fixture sign 100 may be another type of sign. Light fixture sign 100 includes a container 102 and a flange 104. The flange 104 includes a front surface 108 and a rear surface 109. The container 102 is attached to the rear surface 109 of the flange 104. In some embodiments, the container 102 includes a light source, such as one or more high intensity light emitting diodes (LEDs), and a battery pack. A power cable 105 is attached to a rear side of the container 102, and is configured to provide power from an external power source (e.g., the building mains) to elements within the container 102. An emergency power supply provides power for light fixture sign 100 when power is lost to the building mains.

The front surface 108 of the flange 104 includes the message "EXIT" in stencil form and has opposed indicator "V" shaped cut-outs on opposite sides to indicate a right or a left exit. Specifically, the front surface 108 includes stencil openings 110(1)-110(6) (collectively referred to as stencil openings 110). Masks may be used to cover one or both of the direction indicators (i.e., stencil openings 110(1) and 110(6)), which provides a method for customizing the sign in the field.

Common building construction uses wallboard (also referred to as drywall or gypsum board) or other types of panels mounted on studs for the walls, or on joists for ceilings to define individual occupancy spaces (rooms, halls, etc.). The spaces between the studs or joists behind the panels are usually void or occupied by insulation. In commercial buildings and multiple dwellings, some ceilings use panels that fit into metal frames suspended from I-beams or poured concrete layers. For the sake of simplicity, all of these various types of room-defining panels having voids behind them will hereafter be referred to as "walls".

Light fixture sign 100 is configured to be installed in wall 120. Wall 120 is supported by studs 122. Wall 120 includes a rectangular-shaped opening 126, which is sized to receive container 102 therein. Pins 106(1) and 106(2) extend from the rear surface 109 of the flange 104, and are configured to be inserted into respective holes 124(1) and 124(2) in wall 120 to help maintain the installed position of the light fixture sign 100. After installation, the portion of the rear surface 109 of the flange 104 that surrounds the outer perimeter of the container 102 rests against the outer surface of the wall 120, and the front surface 108 of the flange 104 is flush or nearly flush with the outer finished surface of the wall 120. After installation, the flange 104 is the only external part of the light fixture sign 100.

The light fixture sign 100 is a concealed exit sign that allows installation into any of many wall materials. In addition to gypsum board, other wall materials where the light fixture signs disclosed herein can apply include brick and mortar, wood, concrete, fiberglass, and metal construction. Matching wall finishes may be applied to the wall and the light fixture sign 100, including paint and wall paper fabric coverage. The front surface 108 of the light fixture sign 100 may include a textured finished surface to match any other finished wall materials.

After mounting the light fixture sign 100 into the wall 120, standard mudding of plaster compound and fiberglass taping may be applied overlapping the perimeter edges of the flange 104 and the wall surface. This allows the light fixture sign 100 to be concealed on the same plane as the finished wall surface. Feathering of the thin flange 104 blends into the wall finished surface. A surface coverage, such as paint, may be applied across both the front surface 108 of the flange 104 and the surrounding wall area at the same time.

Figure 3:
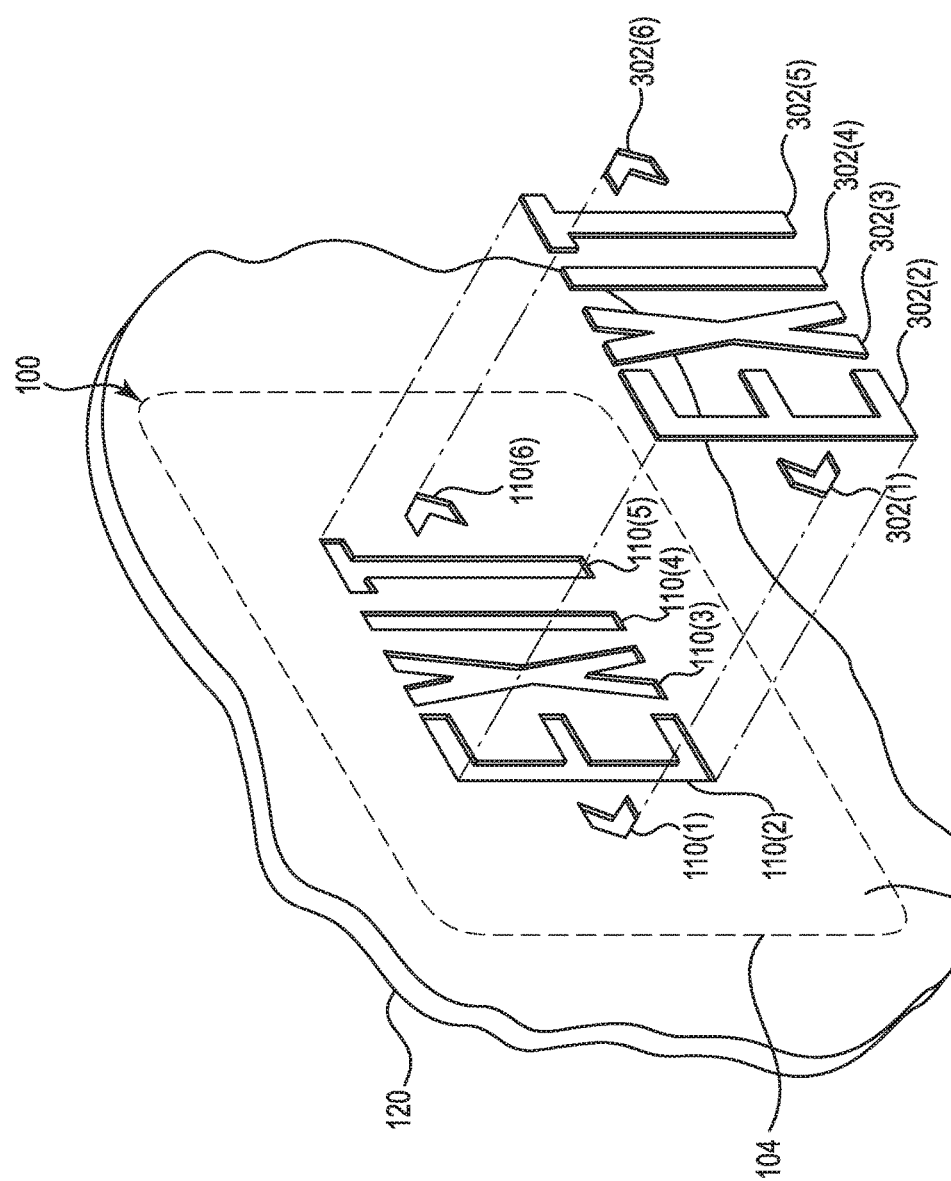
FIG. 3 is a diagram illustrating a perspective view of the light fixture sign shown in FIG. 1 after installation in a wall according to one embodiment.

FIG. 3 is a diagram illustrating a perspective view of the light fixture sign 100 shown in FIG. 1 after installation in a wall according to one embodiment. After installation, the light fixture sign 100 has an aesthetically pleasing appearance in regard to the desire of architects and interior designers because it is concealed and blends in with the surrounding wall surface. The only visible element of the light fixture sign 100 is the letters and arrows themselves. The finished appearance of the light fixture sign 100 is also benefited since there is no need for any visible means of fasteners and mounting brackets. The light fixture sign 100 is mounted flush to the wall 120 or building material surface to provide a completely undetectable installation.

Once the finished paint is applied to the front surface 108 and then cured, removable translucent inserts 302(1)-302(6) (collectively referred to as removable translucent inserts 302) in the shape of letters and arrows can be press fit into place in the stencil openings 110(1)-110(6), respectively. In some embodiments, the translucent inserts 302 are red or green in color. In other embodiments, the translucent inserts 302 are white in color. Other embodiments may include custom colors authorized by building inspectors.

The arrow-shaped inserts 302(1) and 302(6) may be field selected to be used on a particular building installation location where needed for egress path directional information. During an initial installation, a left arrow, right arrow, both arrows, or no arrows arrangement is decided. In some embodiments, the light fixture sign 100 is initially constructed with an arrow-shaped filler or mask that covers the arrow-shaped stencil openings 110(1) and 110(6). During installation, if an arrow is selected to be viewed and illuminated, that corresponding arrow's filler or mask may be removed in the field at the building installation location. If an arrow is not needed in a particular installation, the arrow-shaped filler or mask remains untouched and the finished wall covering is applied over that masked area to completely conceal it from view. Field location decided use of the arrows needed at each building installation is an improvement over other exit signs that must be produced, inventoried, specified correctly and ordered correctly to match the many different arrow configurations throughout all building exit signage locations.

The light fixture sign 100 according to embodiments disclosed herein meets National Electrical Code requirements, which require access to the interior of the electrified lighting fixtures by allowing access and replacement of all interior electrical components and junction box wiring terminations. Removal of the translucent inserts 302 provides complete access to all interior electrical components and junction box wiring terminations of the light fixture sign 100. Other methods other than removable letters may include a solid translucent drop back/slide sideways panel that moves away from the letters and arrows within the enclosure, which would also allow access. In contrast, previous exit sign designs require the dismantling of the exposed constructed enclosure to access the interior for replacement of electrical components and associated junction box wiring terminations.

Previous exit sign designs are visible because of the necessity of exposed removable panels and exposed mounting bracket canopies to secure those exit signs to the wall/mounting locations. Some previous exit sign products do not allow field painting of the sign to match the individual building room installation colors and finishes. Field painting of existing exit signage may not provide an acceptable high quality or long term application of paint or finishes desirable. Also, the addition of any paint or the application of any added layer of finish materials onto those exposed exit signs may void the manufacturer's Underwriters Laboratories (UL), or equivalent third party testing organization testing facility product listing required by the National Electrical Codes, subjecting the building owner to liability concerns. Previous exposed exit signs are not Code approved to be concealed, painted and covered with any field applied matching finishes.

Previous exposed exit signage experiences very high ongoing replacement costs to building owners. Exposed exit signs are typically an easy target for vandalism since those enclosures are noticeably visible and are constructed with components parts that suffer damage easily. Damaged exit signs also cause added liability and safety concerns for people to egress the buildings. In contrast, embodiments of the light fixture sign 100 provide an improvement in regard to vandalism with the concealed enclosure with no visible fasteners. This design reduces possible damage from vandalism since there is no visible exposed enclosure or constructed parts to attract undesirable attention.

Light fixture sign 100 may be implemented as an electrical exit sign, or a non-electrified self illuminated radium/radiation exit sign, or any exit sign version that function as Code approved building egress exit signage. The light fixture sign 100 may be installed in locations that include the typical wall mounting locations near the ceiling and above doorways. The light fixture sign 100 may also be installed near the floor as required in the State of California, which requires an exit sign at the ceiling level and a second same location exit sign at floor level. The light fixture sign 100 may also be installed within an actual door itself, which is the most centrally direct locating of the actual egress path out of a building. Although exit signage embodiments have been discussed, it will be understood that the techniques described herein are also applicable to other types of signage, such as restroom signage, do not enter signage, in use signage (e.g., x-ray in use), as well as others.

The light fixture sign 100 may be constructed with integral illumination lamps, power supplies, emergency lighting battery back-up printed circuit boards, and battery packs. These components can be used in conjunction with a removal electrical component package assembly that is inserted into the completely installed concealed enclosure and also removed at a later time from a connected electrical raceway conduit (tube) system. The electrical component package may use a keyed guide to allow the package to arrive into the proper position within the enclosure for proper Code required illumination distribution. This design option allows the package to be removed and accessed at a remote location to replace a needed component, and then reinserted back into the raceway (tube) and arrive back into the proper position within the concealed enclosure. In this option, a solid permanent translucent panel to illuminate the letters and arrows may be used since access to the interior of the enclosure is not needed by the use of the removable letters and arrows.

Figure 4:
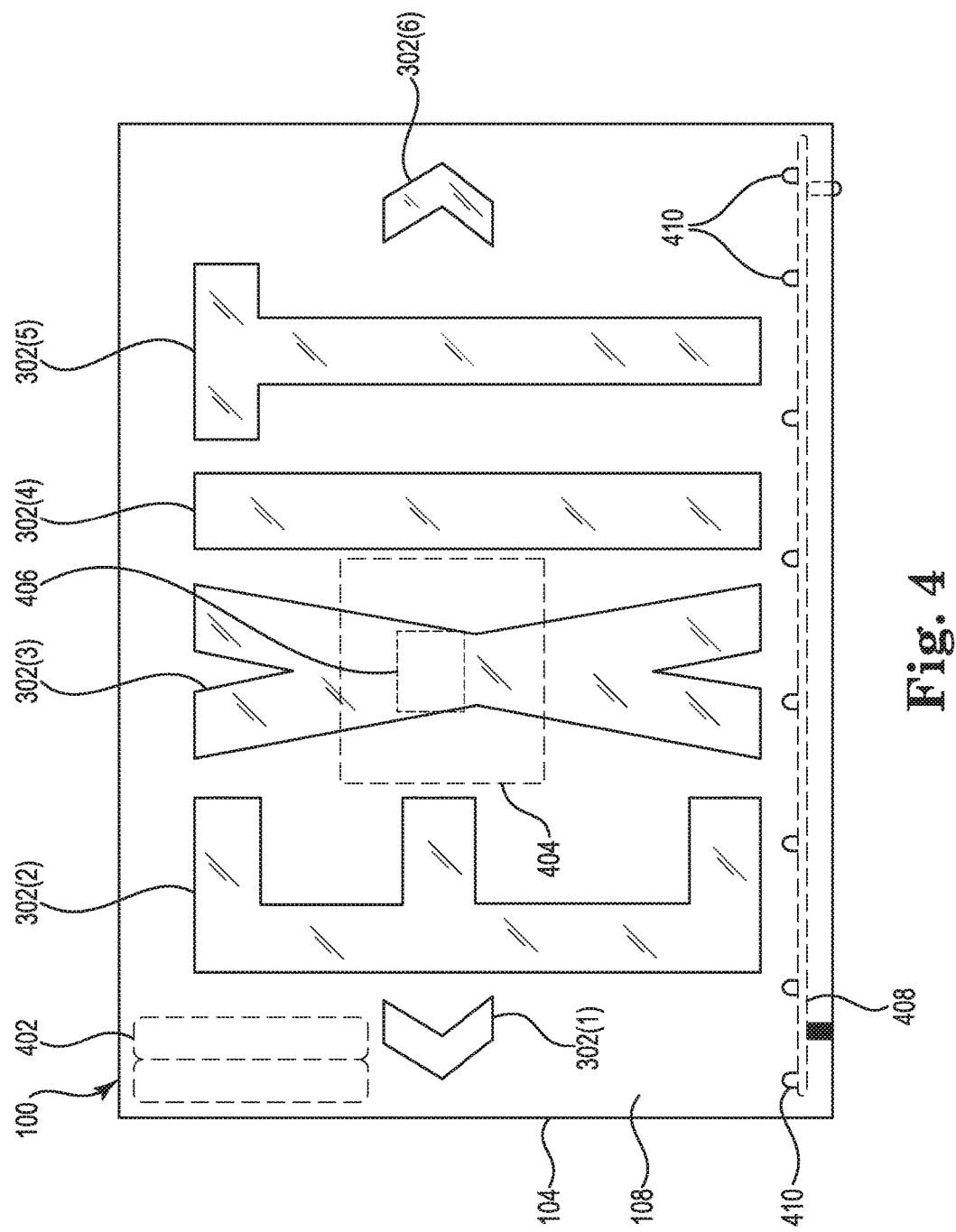
FIG. 4 is a diagram illustrating a front view of the light fixture sign shown in FIG. 1 according to one embodiment.
Figure 5:
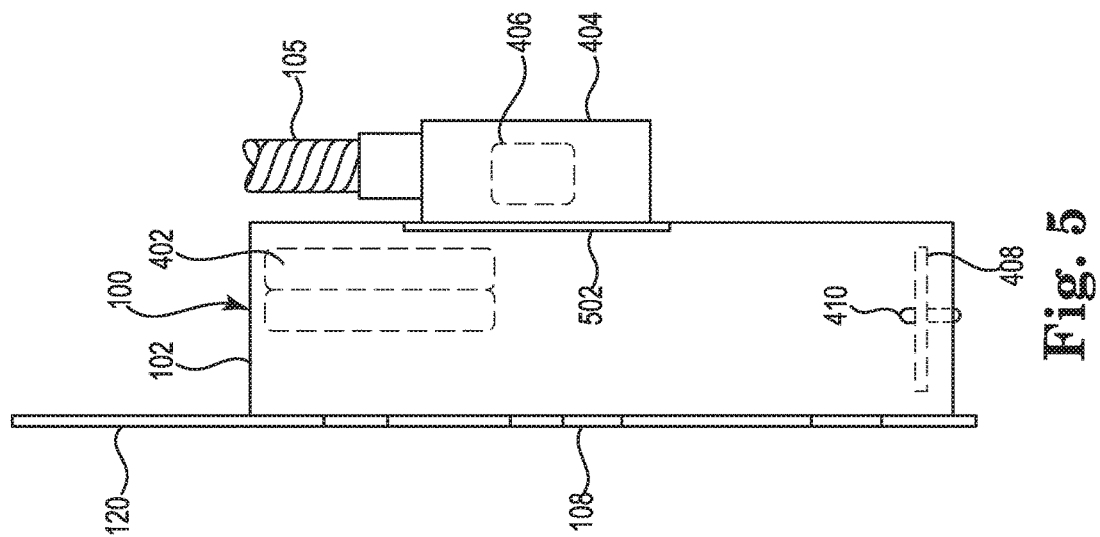
FIG. 5 is a diagram illustrating a side view of the light fixture sign shown in FIG. 1 according to one embodiment.

FIG. 4 is a diagram illustrating a front view of the light fixture sign 100 shown in FIG. 1 according to one embodiment. FIG. 5 is a diagram illustrating a side view of the light fixture sign 100 shown in FIG. 1 according to one embodiment. As shown in FIGS. 4 and 5, the light fixture sign 100 includes a battery pack 402 and a printed circuit board (PCB) 408, which are both mounted within the container 102 (FIG. 1). The PCB 408 supports a bank of light emitting diodes (LEDs) 410. A container 404 is mounted on a rear external surface of the container 102, and includes a power transformer 406 and wiring terminations (not shown). The power transformer 406 is electrically connected to the power cable 105. An access panel 502 on a rear internal surface of the container 102 provides access to the power transformer 406 and wiring terminations within the container 404.

The LEDs 410 are electrically-operated illumination components that may be powered from the building electrical branch circuit power supply system. The power supplied to the light fixture sign 100 can be backed up with an emergency mode power source derived from an exterior emergency engine generator source and/or from a secondary emergency operation battery back-up (e.g., battery back 402) and charger/power components, which are mounted integrally within the light fixture sign 100. Battery back-up and charger/power components that serve one or more light fixture signs can also be served from a remote location. Light fixture sign 100 will typically be constantly energized under building normal power sources under normal power when the normal power source is available. Light fixture sign 100 is configured to monitor the presence of the normal power source. The secondary emergency operation source allows the light fixture sign 100 to automatically continue to operate the exit illumination for a designated time period, such as a minimum of 90 minutes. Upon the return of the normal power building source, the light fixture sign 100 automatically transfers the illumination system to operate from the normal power building source.

The battery pack 402, container 404, power transformer 406, PCB 408, and LEDs 410 are shown with dashed lines in FIG. 4 because these elements are located behind the front surface 108 of the flange 104. However, these elements may be accessed by removing one or more of the translucent inserts 302.

Figure 6:
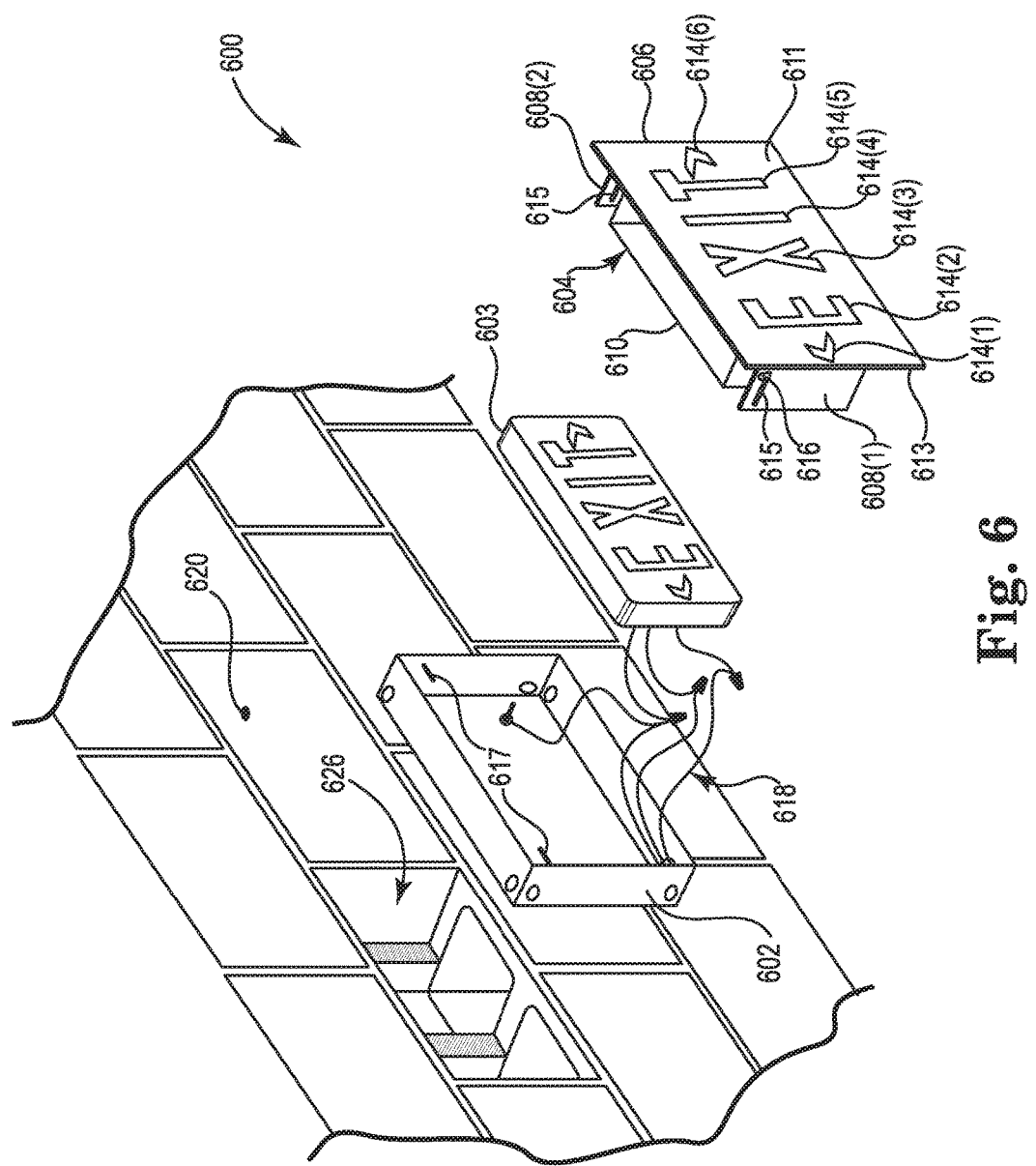
FIG. 6 is a diagram illustrating a perspective view of a light fixture sign prior to installation in a concrete wall according to one embodiment.

FIG. 6 is a diagram illustrating a perspective view of a light fixture sign 600 prior to installation in a concrete wall according to one embodiment. In the illustrated embodiment, the light fixture sign 600 is a light fixture exit sign. In other embodiments, the light fixture sign 600 may be another type of sign. Light fixture sign 600 includes a container 602, a self-contained plastic exit sign 603, and an exit sign face apparatus 604. In some embodiments, the self-contained plastic exit sign 603 is a UL-listed exit sign that includes a light source, such as one or more high intensity LEDs, and a battery pack. The exit sign face apparatus 604 includes mounting brackets 608(1) and 608(2) (collectively referred to as mounting brackets 608), exit sign mounting sleeve 610, and flange 606. The flange 606 includes a front surface 611 and a rear surface 613. The brackets 608 and the mounting sleeve 610 extend from the rear surface 613 of the flange 606.

The front surface 611 of the flange 606 includes the message "EXIT" in stencil form and has opposed indicator "V" shaped cut-outs on opposite sides to indicate a right or a left exit. Specifically, the front surface 611 includes stencil openings 614(1)-614(6) (collectively referred to as stencil openings 614). Masks may be used to cover one or both of the direction indicators (i.e., stencil openings 614(1) and 614(6)), which provides a method for customizing the sign in the field.

Light fixture sign 600 is configured to be installed in concrete block wall 620. Wall 620 includes a rectangular-shaped opening 626, which is sized to receive container 602 therein. The light fixture sign 600 is configured to be mounted flush with the surface of the concrete block wall 620. The container 602 is positioned completely within the opening 626 of the concrete block wall 620. The recessed container 602 is located so that the open end of the container 602 is aligned flush with the surrounding concrete blocks of the wall construction. The exit sign face apparatus 604 is inserted into the installed container 602, such that the front surface 611 is positioned in the same plane as the surrounding wall 620. The front surface 611 may be textured and painted to match the surrounding concrete block wall 620. When the front surface 611 matching finish is completed and cured, the exit sign face apparatus 604 may be removed from the wall 620, and the self-contained exit sign 603 may be placed into the mounting sleeve 610 with the letters and arrows of the exit sign 603 aligned with corresponding letter and arrow stencil openings 614 of the exit sign face apparatus 604.

Container 602 is electrically connected to an external power source (e.g., the building mains), and power from the external power source is provided to self-contained exit sign 603 by interconnecting the container 602 and the exit sign 603 with wires 618. An emergency power supply may provide power for self-contained exit sign 603 when power is lost to the building mains.

The exit sign face apparatus 604 with the self-contained exit sign 603 contained therein is positioned in its final position by sliding slots 615 formed in the brackets 608 onto the ends of side-mounted support pins 617 that are mounted on the interior sides of the container 602. Once the exit sign face apparatus 604 is completely inserted into the container 602, the pins 617 engage with respective alignment notches 616 formed at an end of the slots 615 to help maintain the exit sign face apparatus 604 in its final flush-mounted position. Safety chains may be used to support the exit sign face apparatus 604 from the container 602 while electrical power connection terminations are completed, and may also prevent future inadvertent separation or loss of the exit sign face apparatus 604 from the container 602 after installation. After installation, the front surface 611 of the flange 606 is flush or nearly flush with the outer finished surface of the wall 620, and the flange 606 is the only external part of the light fixture sign 600.

Translucent inserts 302(1)-302(6) (FIG. 3) in the shape of letters and arrows are positioned (removably or permanently) in the stencil openings 614(1)-614(6), respectively. In some embodiments, the translucent inserts 302 are red or green in color. In other embodiments, the translucent inserts 302 are white in color. Other embodiments may include custom colors authorized by building inspectors.

The arrow-shaped inserts 302(1) and 302(6) may be field selected to be used on a particular building installation location where needed for egress path directional information. During an initial installation, a left arrow, right arrow, both arrows, or no arrows arrangement is decided. In some embodiments, the light fixture sign 600 is initially constructed with an arrow-shaped filler or mask that covers the arrow-shaped stencil openings 614(1) and 614(6). During installation, if an arrow is selected to be viewed and illuminated, that corresponding arrow's filler or mask may be removed in the field at the building installation location. If an arrow is not needed in a particular installation, the arrow-shaped filler or mask remains untouched and the finished wall covering is applied over that masked area to completely conceal it from view. Field location decided use of the arrows needed at each building installation is an improvement over other exit signs that must be produced, inventoried, specified correctly and ordered correctly to match the many different arrow configurations throughout all building exit signage locations.

Light fixture sign 600 can use any existing exit sign light fixture for the self-contained exit sign 603, while still providing a flush and concealed installation. Previous exposed exit signage experiences very high ongoing replacement costs to building owners. Exposed exit signs are typically an easy target for vandalism since those enclosures are noticeably visible and are constructed with components parts that suffer damage easily. Damaged exit signs also cause added liability and safety concerns for people to egress the buildings. In contrast, embodiments of the light fixture sign 600 provide an improvement in regard to vandalism with the concealed enclosure with no visible fasteners. This design reduces possible damage from vandalism since there is no visible exposed enclosure or constructed parts to attract undesirable attention.

Figure 7:
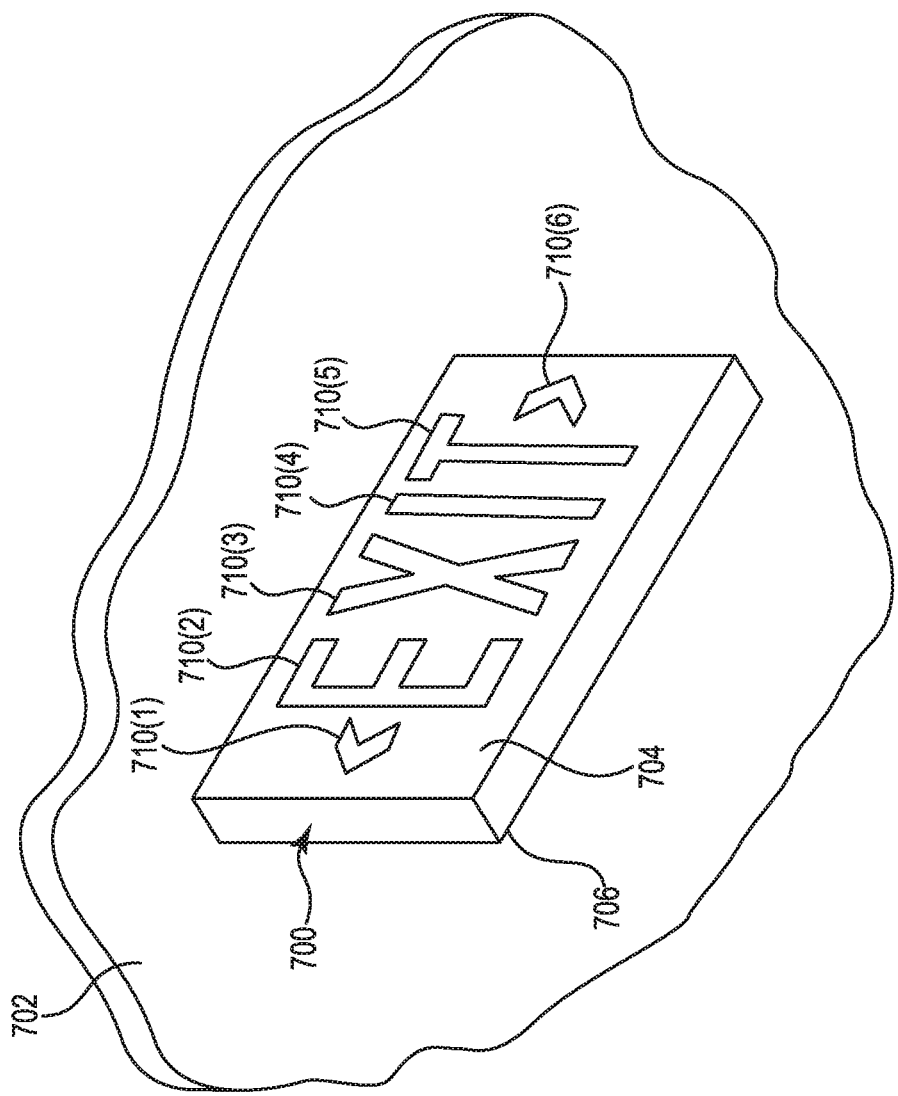
FIG. 7 is a diagram illustrating a perspective view of a light fixture sign mounted on a ceiling according to one embodiment.

FIG. 7 is a diagram illustrating a perspective view of a light fixture sign 700 mounted on a ceiling 702 according to one embodiment. In the illustrated embodiment, the light fixture sign 700 is a light fixture exit sign. In other embodiments, the light fixture sign 700 may be another type of sign. In one embodiment, light fixture sign 700 is a single-sided sign, and in another embodiment, light fixture sign 700 is a double-sided sign. Light fixture sign 700 includes a front surface 704 and a rear surface 706. In some embodiments, the light fixture sign 700 includes a light source, such as one or more high intensity light emitting diodes (LEDs), and a battery pack.

The front surface 704 of the light fixture sign 700 includes the message "EXIT" in stencil form and has opposed indicator "V" shaped cut-outs on opposite sides to indicate a right or a left exit. Specifically, the front surface 704 includes stencil openings 710(1)-710(6) (collectively referred to as stencil openings 710). Masks may be used to cover one or both of the direction indicators (i.e., stencil openings 710(1) and 710(6)), which provides a method for customizing the sign in the field. For a double-sided embodiment of the light fixture sign 700, the rear surface 706 also includes stencil openings 710.

Previous exit sign designs require the dismantling of the exposed constructed enclosure to access the interior for replacement of electrical components and associated junction box wiring terminations. In contrast, the internal components of the light fixture sign 700 are accessible without such dismantling, and the means of access is concealed and not visible. Access to the internal components of the light fixture sign 700 is described in further detail below with reference to FIGS. 8 and 9. Previous exposed exit signs are not Code approved to be concealed, painted and covered with any field applied matching finishes. In contrast, the light fixture sign 700 can be painted or finished in the field to match any finishes used in each individual building installation during the installation stage to provide an aesthetically pleasing appearance.

Figure 8:
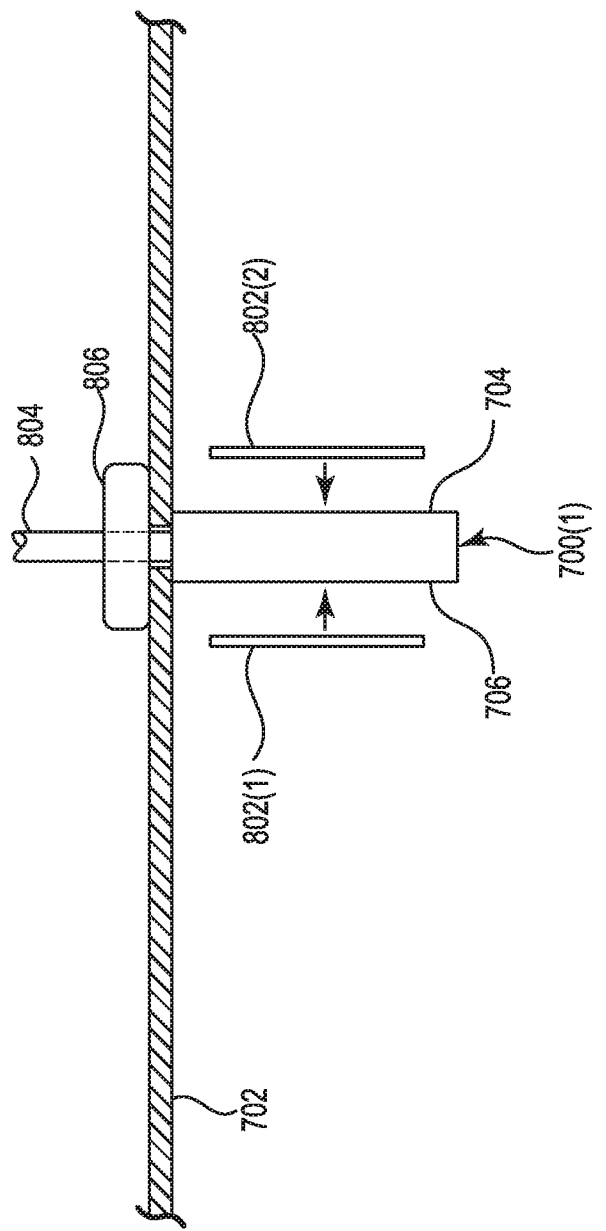
FIG. 8 is a diagram illustrating a side view of the ceiling-mounted light fixture sign shown in FIG. 7 according to one embodiment.

FIG. 8 is a diagram illustrating a side view of the ceiling-mounted light fixture sign 700 shown in FIG. 7 according to one embodiment. The embodiment of the light fixture sign 700 shown in FIG. 8 is identified by reference number 700(1). The light fixture sign 700(1) is connected through the ceiling 702 to a ceiling structure 806 located above the ceiling 702. A power cable 804 positioned above the ceiling 702 is attached through the ceiling 702 to a top side of the light fixture sign 700(1), and is configured to provide power from an external power source (e.g., the building mains) to elements within the light fixture sign 700(1). An emergency power supply provides power for light fixture sign 700(1) when power is lost to the building mains.

In the embodiment shown in FIG. 8, the ceiling 702 is not accessible. Because the ceiling 702 is not accessible, access to the internal components of the light fixture sign 700(1) is provided by removable translucent inserts 802(1) and 802(2) (collectively referred to as translucent inserts 802) in the shape of letters and arrows, which can be press fit into place in the stencil openings 710 (FIG. 7). For the illustrated double-sided embodiment, translucent inserts 802(1) are inserted into stencil openings 710 in the rear surface 706, and translucent inserts 802(2) are inserted into stencil openings 710 in the front surface 704. In some embodiments, the translucent inserts 802 are red or green in color. In other embodiments, the translucent inserts 802 are white in color. Other embodiments may include custom colors authorized by building inspectors.

The translucent inserts 802 may include arrow-shaped inserts that may be field selected to be used on a particular building installation location where needed for egress path directional information. During an initial installation, a left arrow, right arrow, both arrows, or no arrows arrangement is decided. In some embodiments, the light fixture sign 700(1) is initially constructed with an arrow-shaped filler or mask that covers the arrow-shaped stencil openings 710(1) and 710(6). During installation, if an arrow is selected to be viewed and illuminated, that corresponding arrow's filler or mask may be removed in the field at the building installation location. If an arrow is not needed in a particular installation, the arrow-shaped filler or mask remains untouched and the finished wall covering is applied over that masked area to completely conceal it from view. Field location decided use of the arrows needed at each building installation is an improvement over other exit signs that must be produced, inventoried, specified correctly and ordered correctly to match the many different arrow configurations throughout all building exit signage locations.

The light fixture sign 700(1) meets National Electrical Code requirements, which require access to the interior of the electrified lighting fixtures by allowing access and replacement of all interior electrical components and junction box wiring terminations. Removal of the translucent inserts 802(1) and 802(2) provides complete access to all interior electrical components and junction box wiring terminations of the light fixture sign 700(1). In contrast, previous exit sign designs require the dismantling of the exposed constructed enclosure to access the interior for replacement of electrical components and associated junction box wiring terminations.

Figure 9:
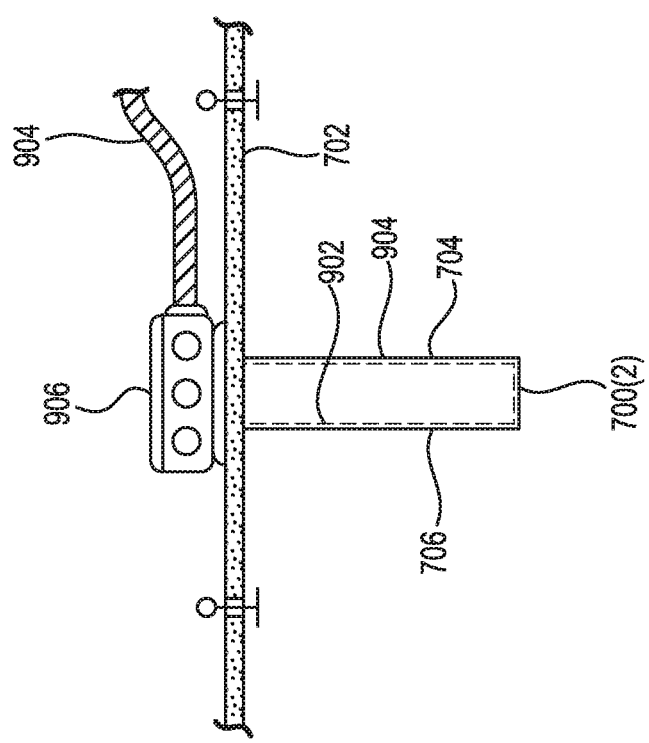
FIG. 9 is a diagram illustrating a side view of the ceiling-mounted light fixture sign shown in FIG. 7 according to another embodiment.

FIG. 9 is a diagram illustrating a side view of the ceiling-mounted light fixture sign 700 shown in FIG. 7 according to another embodiment. The embodiment of the light fixture sign 700 shown in FIG. 9 is identified by reference number 700(2). A top side of the light fixture sign 700(2) is connected through the ceiling 702 to a power cable apparatus 906 located above the ceiling 702. A power cable 904 positioned above the ceiling 702 is attached to the apparatus 906, and is configured to provide power from an external power source (e.g., the building mains) to elements within the light fixture sign 700(2). An emergency power supply provides power for light fixture sign 700(2) when power is lost to the building mains. In the embodiment shown in FIG. 9, the ceiling 702 is accessible, so access to the internal components of the light fixture sign 700(2) may be provided, for example, by removing a panel from the ceiling 702.

The light fixture sign 700(2) includes an exit sign container 904 and a self-contained plastic exit sign 902. The self-contained exit sign 902 is inserted into an open top end of the exit sign container 904. Access to the self-contained exit sign 902 may be provided by lifting the apparatus 906 away from the light fixture sign 700(2), and removing the self-contained exit sign 902 from the exit sign container 904. In some embodiments, the self-contained exit sign 902 is a UL-listed exit sign that includes a light source, such as one or more high intensity LEDs, and a battery pack. The light fixture sign 700(2) meets National Electrical Code requirements, which require access to the interior of the electrified lighting fixtures by allowing access and replacement of all interior electrical components and junction box wiring terminations.

Translucent inserts 802 (FIG. 8) in the shape of letters and arrows are positioned (removably or permanently) in the stencil openings 710 (FIG. 7) in one or both of the front surface 704 and rear surface 706. In some embodiments, the translucent inserts 802 are red or green in color. In other embodiments, the translucent inserts 802 are white in color. Other embodiments may include custom colors authorized by building inspectors.

The translucent inserts 802 may include arrow-shaped inserts that may be field selected to be used on a particular building installation location where needed for egress path directional information. During an initial installation, a left arrow, right arrow, both arrows, or no arrows arrangement is decided. In some embodiments, the light fixture sign 700(2) is initially constructed with an arrow-shaped filler or mask that covers the arrow-shaped stencil openings 710(1) and 710(6). During installation, if an arrow is selected to be viewed and illuminated, that corresponding arrow's filler or mask may be removed in the field at the building installation location. If an arrow is not needed in a particular installation, the arrow-shaped filler or mask remains untouched and the finished wall covering is applied over that masked area to completely conceal it from view. Field location decided use of the arrows needed at each building installation is an improvement over other exit signs that must be produced, inventoried, specified correctly and ordered correctly to match the many different arrow configurations throughout all building exit signage locations.

Figure 10:
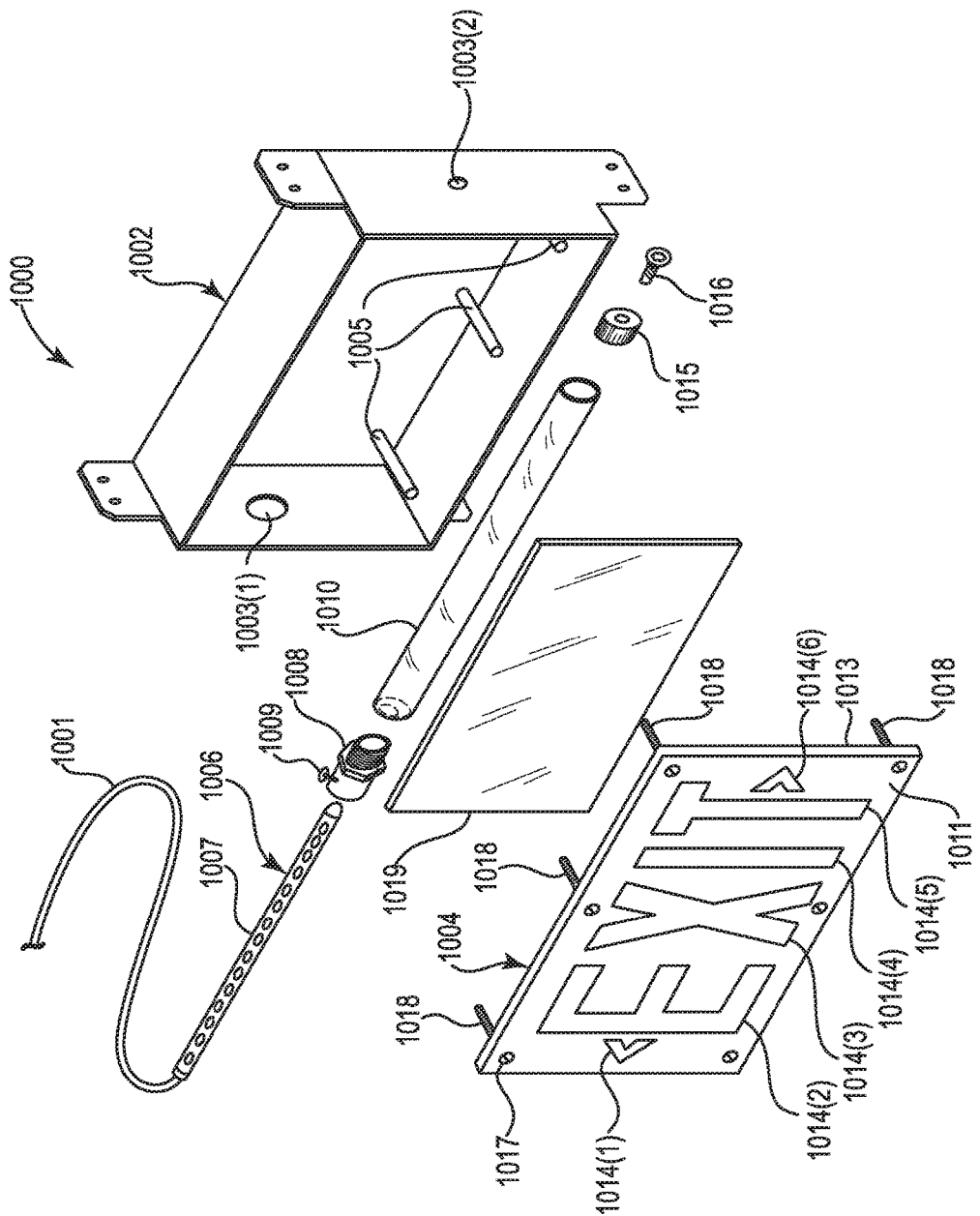
FIG. 10 is a diagram illustrating a perspective view of a light fixture sign with a removable light source apparatus prior to installation in a wall according to one embodiment.

FIG. 10 is a diagram illustrating a perspective view of a light fixture sign 1000 with a removable light source apparatus prior to installation in a wall according to one embodiment. In the illustrated embodiment, the light fixture sign 1000 is a light fixture exit sign. In other embodiments, the light fixture sign 1000 may be another type of sign. Light fixture sign 1000 includes a container 1002, a clear plastic backing sheet (e.g., plexiglass) 1019, an exit sign face 1004, and a removable light source apparatus 1006.

The exit sign face 1004 includes a front surface 1011 and a rear surface 1013. The exit sign face 1004 includes the message "EXIT" in stencil form and has opposed indicator "V" shaped cut-outs on opposite sides to indicate a right or a left exit. Specifically, the exit sign face 1004 includes stencil openings 1014(1)-1014(6) (collectively referred to as stencil openings 1014). Masks may be used to cover one or both of the direction indicators (i.e., stencil openings 1014(1) and 1014(6)), which provides a method for customizing the sign in the field. Clear plastic backing sheet 1019 is configured to be mounted to the rear surface 1013 of the exit sign face 1004.

The exit sign face 1004 includes six openings 1017 formed through the face 1004, and six screws 1018 respectively inserted through the six openings 1017. The six screws 1018 are configured to be respectively screwed into six posts 1005 that extend from a rear interior surface of the container 1002 to mount the exit sign face 1004 and the clear plastic backing sheet 1019 to the container 1002.

The removable light source apparatus 1006 includes a power cable 1001, a flexible LED array 1007, a proximal end cap 1008 having a set screw 1009, a clear plastic tube (e.g., a plexiglass tube) 1010, a distal end cap 1015, and a screw 1016. The power cable 1001 is coupled to a proximal end of the flexible LED array 1007, and provides power to the LED array 1007. The power cable 1001 is electrically connected to an external power source (e.g., the building mains). An emergency power supply may provide power for light fixture sign 1000 when power is lost to the building mains. Proximal end cap 1008 is inserted into a proximal end of the tube 1010, and distal end cap 1015 is inserted into a distal end of the tube 1010. LED array 1007 is inserted through the proximal end cap 1008 and into the tube 1010, and is secured in place by set screw 1009.

Figure 11:
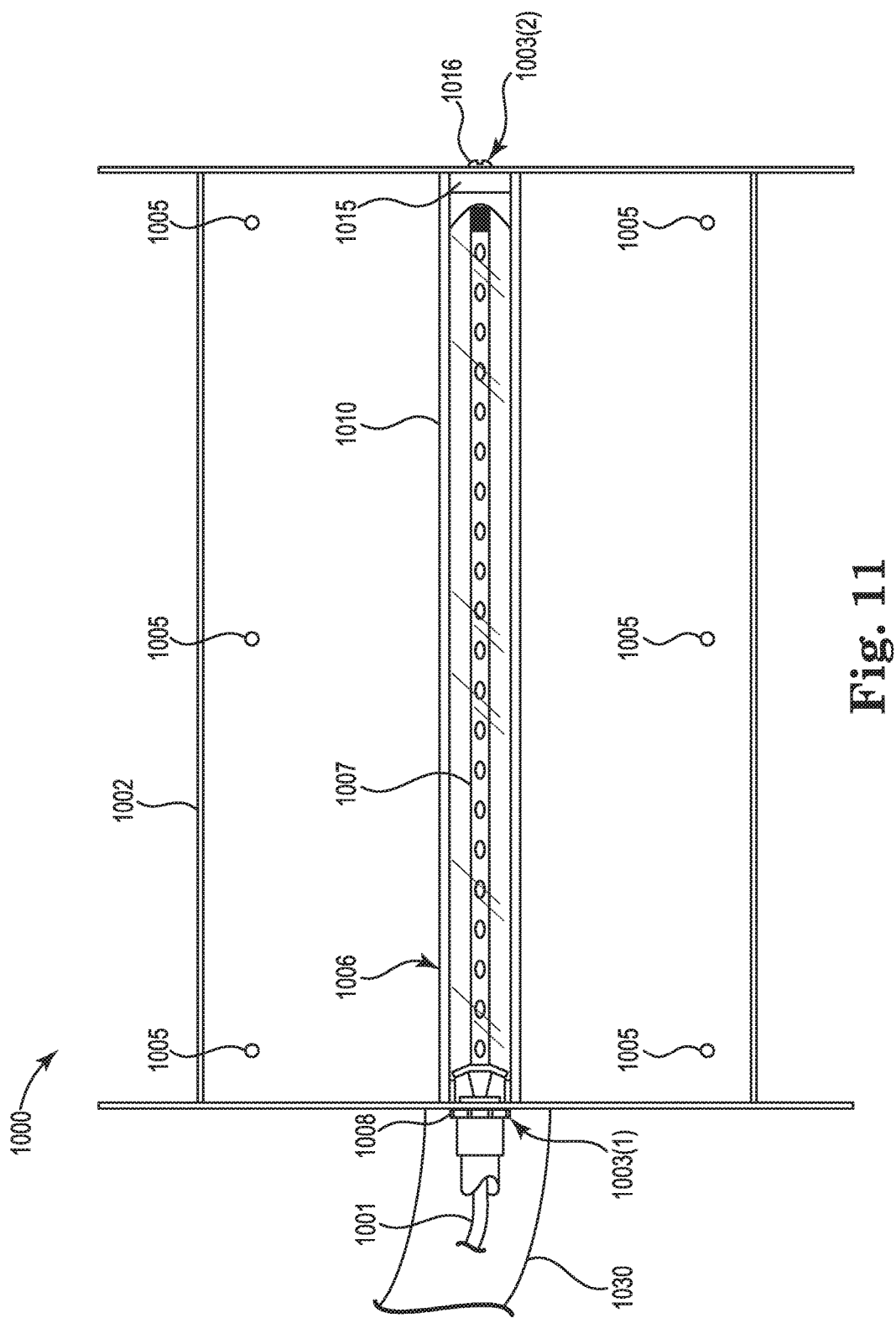
FIG. 11 is a diagram illustrating a front view of the light fixture sign shown in FIG. 10 with the exit sign face and the clear plastic backing sheet removed according to one embodiment.
Figure 12:
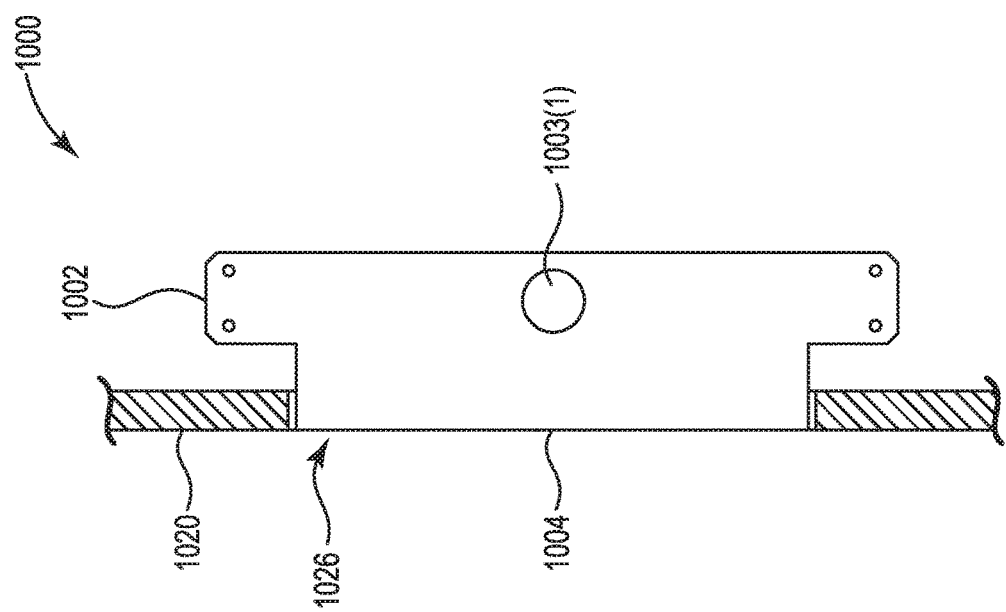
FIG. 12 is a diagram illustrating a side view of the light fixture sign shown in FIG. 10 according to one embodiment.

FIG. 11 is a diagram illustrating a front view of the light fixture sign 1000 shown in FIG. 10 with the exit sign face 1004 and the clear plastic backing sheet 1019 removed according to one embodiment. FIG. 12 is a diagram illustrating a side view of the light fixture sign 1000 shown in FIG. 10 according to one embodiment. After light source apparatus 1006 has been assembled as described above, the light source apparatus 1006 is inserted into an opening 1003(1) formed in a first side of the container 1002. A keyed guide may be used at the point of entrance into the container 1002 to help ensure that the lighting position is correct. In the illustrated embodiment, after inserted into the container 1002, the light source apparatus 1006 extends across an entire width of the container 1002, and is held in place at its distal end by screw 1016. Screw 1016 extends through an opening 1003(2) formed in a second side (opposite the first side) of the container 1002, and is screwed into the distal end cap 1015.

Light fixture sign 1000 is configured to be installed in wall 1020 (FIG. 12). Wall 1020 includes a rectangular-shaped opening 1026, which is sized to receive container 1002 therein. The light fixture sign 1000 is configured to be mounted flush with the external surface of the wall 1020. The container 1002 is positioned completely within the opening 1026 of the wall 1020. The recessed container 1002 is located so that the open end of the container 1002 is aligned flush with the surrounding external surface of the wall construction.

The exit sign face 1004 with the clear plastic backing sheet 1019 attached thereto is inserted into the installed container 1002, such that the front surface 1011 is positioned in the same plane as the surrounding wall 1020. The front surface 1011 may be textured and painted to match the surrounding wall 1020. After installation, the front surface 1011 of the exit sign face 1004 is flush or nearly flush with the outer finished surface of the wall 1020, and the front surface 1011 is the only external part of the installed light fixture sign 1000.

Translucent inserts 302(1)-302(6) (FIG. 3) in the shape of letters and arrows are positioned (removably or permanently) in the stencil openings 1014(1)-1014(6), respectively. In some embodiments, the translucent inserts 302 are red or green in color. In other embodiments, the translucent inserts 302 are white in color. Other embodiments may include custom colors authorized by building inspectors.

The removable light source apparatus 1006 acts as a removable pod that may be easily inserted into and removed from the container 1002 before or after installation of the light fixture sign 1000, even if user access to the light fixture sign 1000 itself is not available. In addition to including a light source, such as the LED array 1007, the removable light source apparatus 1006 may also include other elements, such as power components and a battery pack. The power cable 1001 may include a metallic pull/push cable to handle the tension during insertion and removal. At any point after installation of the light fixture sign 1000, the light source apparatus 1006 may be easily removed and replaced from a remote location without direct access to the light fixture sign 1000 by pulling the light source apparatus 1006 through the opening 1003(1) via the power cable 1001. The light source apparatus 1006 may be pulled through conduit 1030 (FIG. 11) to a user-accessible remote location for electrical access and parts maintenance/replacement. The removable light source apparatus 1006 may be used in any of the light fixture sign embodiments disclosed herein.

Figure 13:
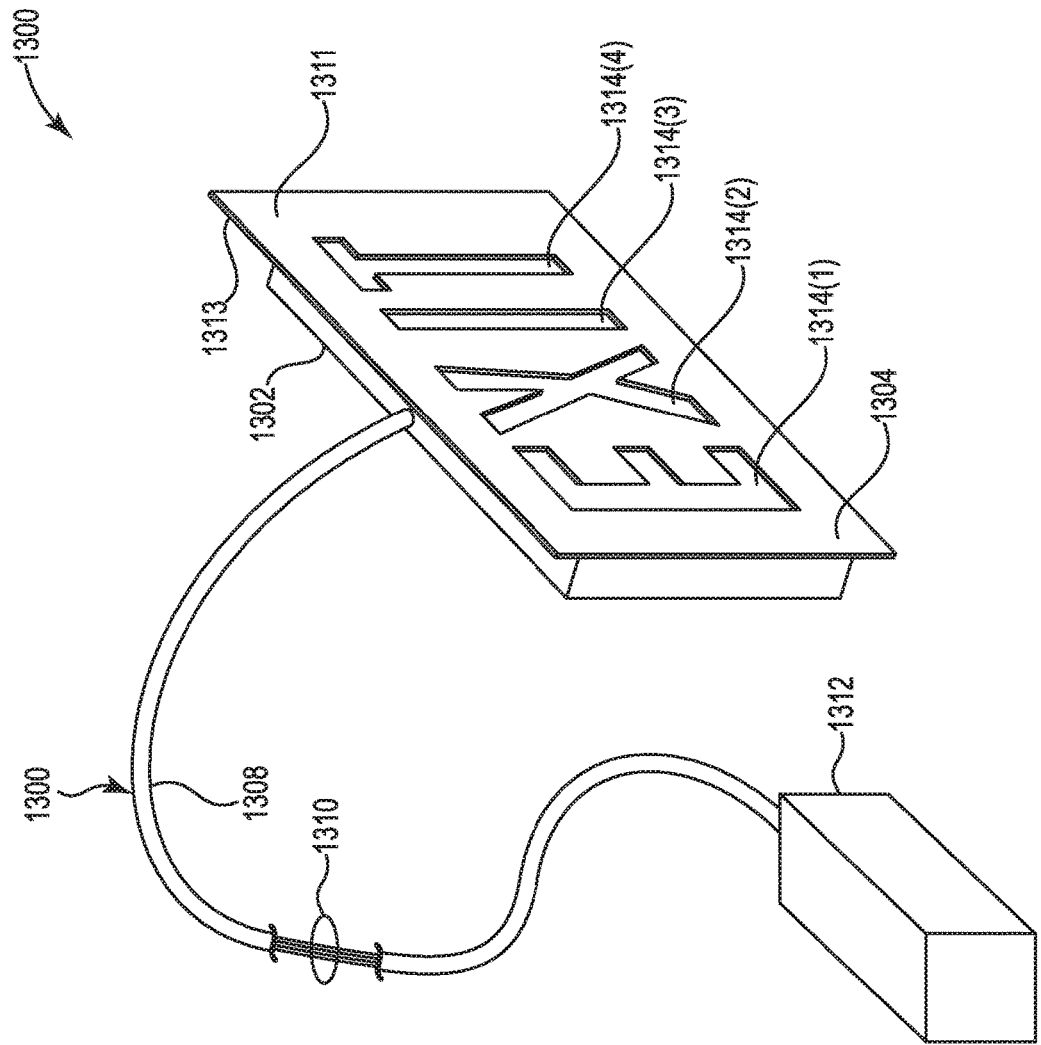
FIG. 13 is a diagram illustrating a perspective view of a light fixture sign with a remote light source apparatus according to one embodiment.

FIG. 13 is a diagram illustrating a perspective view of a light fixture sign 1300 with a remote light source apparatus according to one embodiment. In the illustrated embodiment, the light fixture sign 1300 is a light fixture exit sign. In other embodiments, the light fixture sign 1300 may be another type of sign. Light fixture sign 1300 includes a container 1302, a flange 1304, and a remote light source apparatus 1306 that is external to the container 1302.

The flange 1304 includes a front surface 1311 and a rear surface 1313. The flange 1304 includes the message "EXIT" in stencil form. Specifically, the flange 1304 includes stencil openings 1314(1)-1314(4) (collectively referred to as stencil openings 1314). Translucent inserts 302(2)-302(5) (FIG. 3) in the shape of letters and arrows are positioned (removably or permanently) in the stencil openings 1314(1)-1314(4), respectively. In some embodiments, the translucent inserts 302 are red or green in color. In other embodiments, the translucent inserts 302 are white in color. Other embodiments may include custom colors authorized by building inspectors.

The remote light source apparatus 1306 includes a remote light source 1312, a fiber optic cable 1310 with a plurality of individual fiber optic elements, and a conduit 1308. The conduit 1308 encloses the fiber optic cable 1310 and protects the cable 1310 from damage. A proximal end of the fiber optic cable 1310 is coupled to the light source 1312, and a distal end of the fiber optic cable 1310 is coupled to a top side of the container 1302. The light source 1312 is electrically connected to an external power source (e.g., the building mains). The light source 1312 generates light, which is guided by the fiber optic cable 1310 from the light source 1312 to the interior of the container 1302 to illuminate the EXIT message defined by the stencil openings 1314. The light source apparatus 1306 may also include additional components, such as power components and a battery pack. The remote light source apparatus 1306 may be used in any of the light fixture sign embodiments disclosed herein.

Light fixture sign 1300 is configured to be installed in a wall, and to be mounted flush with the external surface of the wall. The container 1302 may be positioned completely within an opening of the wall. The front surface 1311 of the flange 1304 may be textured and painted to match the surrounding wall. After installation, the front surface 1311 of the flange 1304 will be flush or nearly flush with the outer finished surface of the wall, and the front surface 1311 is the only external part of the installed light fixture sign 1300.

Figure 14:
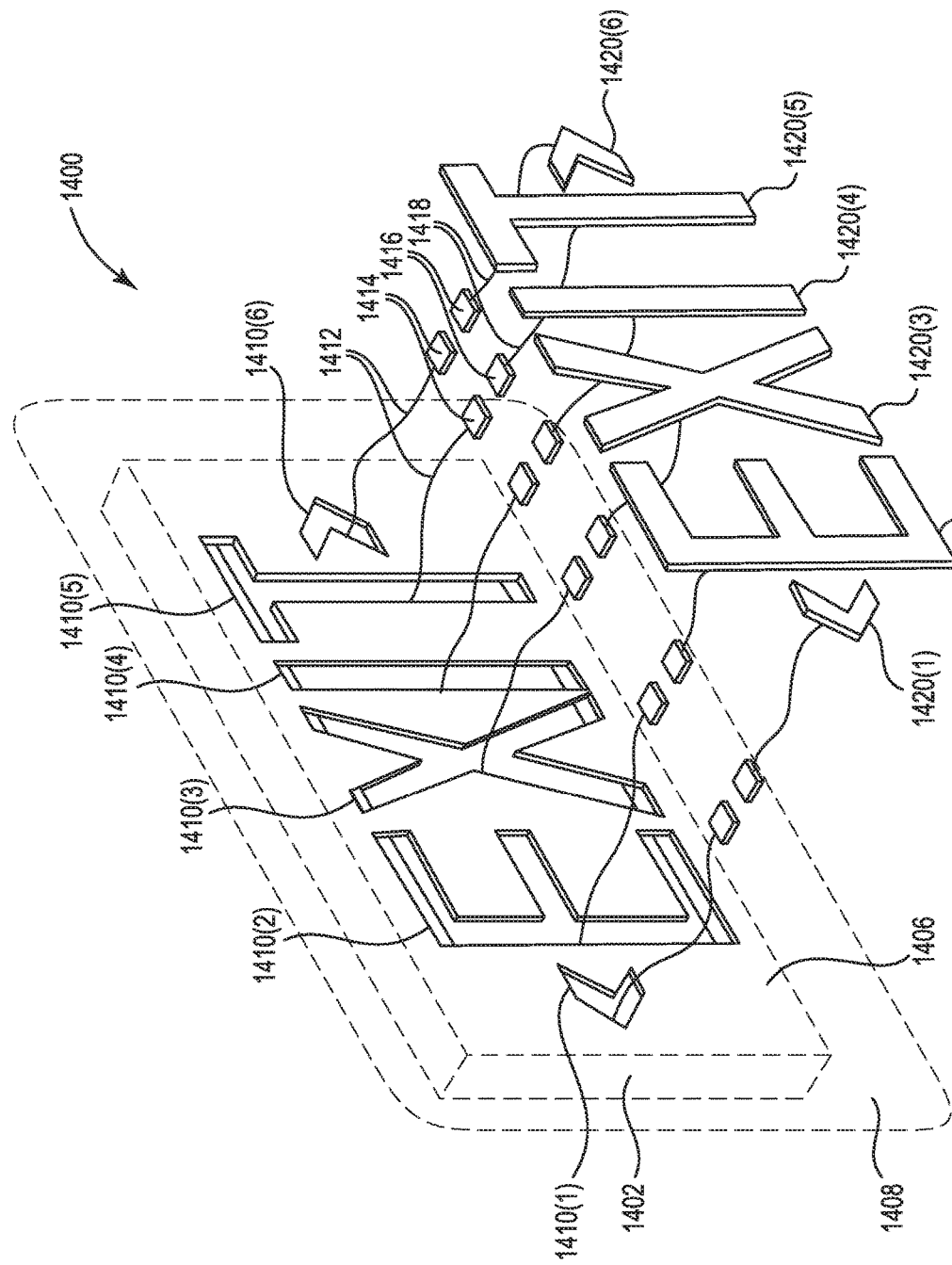
FIG. 14 is a diagram illustrating a perspective view of a light fixture sign with removable electroluminescent inserts according to one embodiment.

FIG. 14 is a diagram illustrating a perspective view of a light fixture sign 1400 with removable electroluminescent inserts according to one embodiment. In the illustrated embodiment, the light fixture sign 1400 is a light fixture exit sign. In other embodiments, the light fixture sign 1400 may be another type of sign. Light fixture sign 1400 includes a container 1402 with a front surface 1406.

The front surface 1406 of the container 1402 includes the message "EXIT" in stencil form and has opposed indicator "V" shaped cut-outs on opposite sides to indicate a right or a left exit. Specifically, the front surface 1406 includes stencil openings 1410(1)-1410(6) (collectively referred to as stencil openings 1410). Masks may be used to cover one or both of the direction indicators (i.e., stencil openings 1410(1) and 1410(6)), which provides a method for customizing the sign in the field.

Light fixture sign 1400 is shown installed in wall 1408. After installation, the front surface 1406 of the container 1402 is flush or nearly flush with the outer finished surface of the wall 1408. After installation, the front surface 1406 is the only external part of the light fixture sign 1400.

The light fixture sign 1400 is a concealed exit sign that allows installation into any of many wall materials. In addition to gypsum board, other wall materials where the light fixture signs disclosed herein can apply include brick and mortar, wood, concrete, fiberglass, and metal construction. Matching wall finishes may be applied to the wall and the light fixture sign 1400, including paint and wall paper fabric coverage. The front surface 1406 of the light fixture sign 1400 may include a textured finished surface to match any other finished wall materials.

After installation in wall 1408, the light fixture sign 1400 has an aesthetically pleasing appearance in regard to the desire of architects and interior designers because it is concealed and blends in with the surrounding wall surface. The only visible element of the light fixture sign 1400 is the letters and arrows themselves. The finished appearance of the light fixture sign 1400 is also benefited since there is no need for any visible means of fasteners and mounting brackets. The light fixture sign 1400 is mounted flush to the wall 1408 or building material surface to provide a completely undetectable installation.

Figure 15:
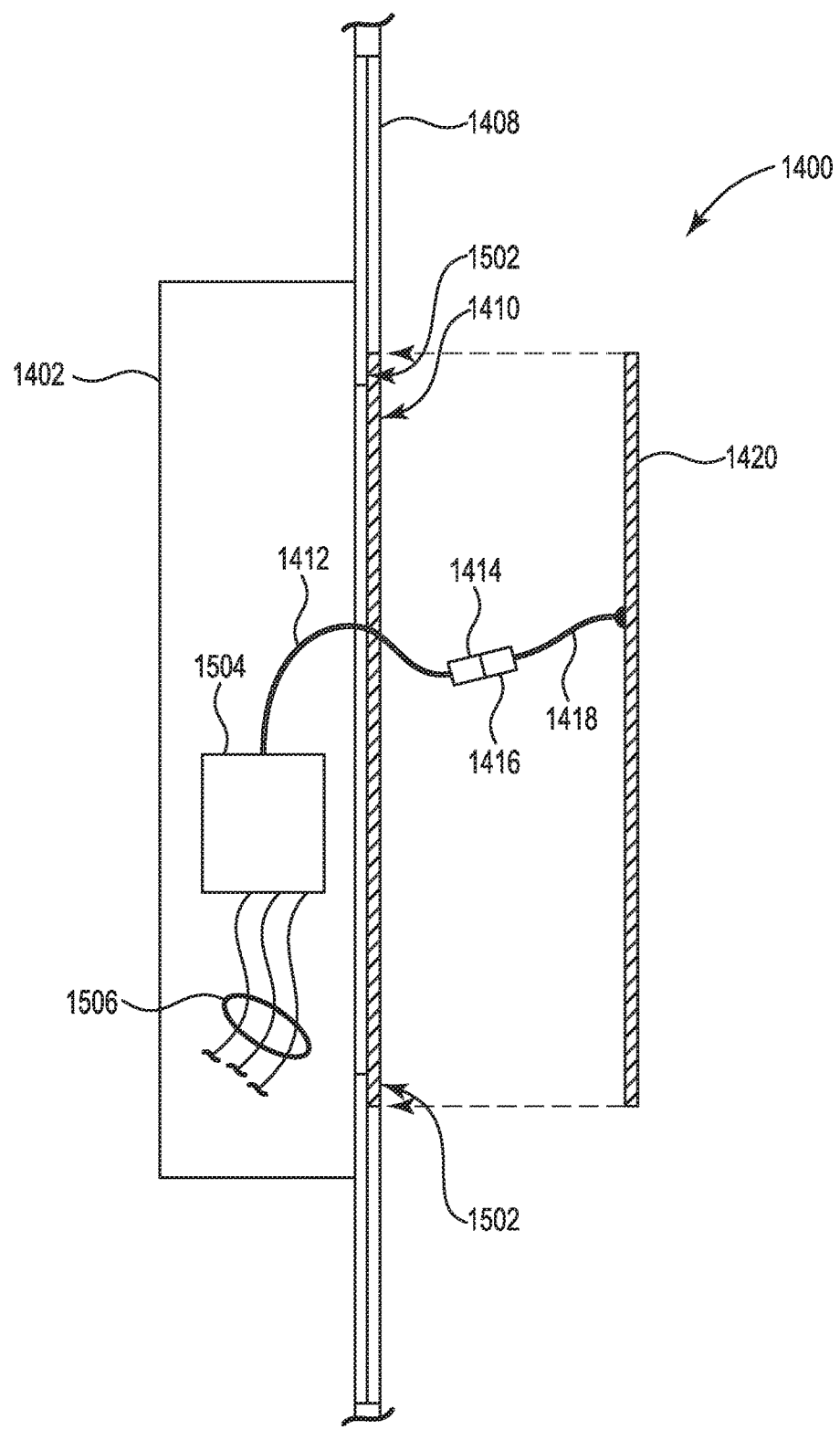
FIG. 15 is a diagram illustrating a side view of the light fixture sign shown in FIG. 14 according to one embodiment.

Once the finished paint is applied to the front surface 1406 and then cured, removable electroluminescent inserts 1420(1)-1420(6) (collectively referred to as removable electroluminescent inserts 1420) in the shape of letters and arrows can be press fit into place in the stencil openings 1410(1)-1410(6), respectively. Prior to insertion into the stencil openings 1410, the removable electroluminescent inserts 1420 are electrically coupled to a power supply 1504 (FIG. 15). Specifically, a plurality of wires 1412 are electrically connected to the power supply 1504, with each of the wires terminating in a connector 1414. The wires 1412 and the connectors 1414 may be pulled through the stencil openings 1410, as shown in FIG. 14, to facilitate connection with the electroluminescent inserts 1420. Each of the electroluminescent inserts 1420 includes a wire 1418 extending from a rear surface of the insert 1420, and each of the wires 1418 terminates in a connector 1416. Each of the connectors 1414 may be connected to a respective one of the connectors 1416, thereby electrically connecting the electroluminescent inserts 1420 to the power supply 1504. After the electrical connection is made, the wires 1412 and 1418 and the connectors 1414 and 1416 may be inserted through the stencil openings 1410 and into the container 1402 to allow the electroluminescent inserts 1420 to be inserted into the stencil openings 1410. In another embodiment, solidly mounted male and female pin and socket connectors may be used such that the electroluminescent inserts 1420 are energized once they are plugged into their final mounted positions.

The arrow-shaped inserts 1420(1) and 1420(6) may be field selected to be used on a particular building installation location where needed for egress path directional information. During an initial installation, a left arrow, right arrow, both arrows, or no arrows arrangement is decided.

The light fixture sign 1400 according to embodiments disclosed herein meets National Electrical Code requirements, which require access to the interior of the electrified lighting fixtures by allowing access and replacement of all interior electrical components and junction box wiring terminations. All of the electrical components of the light fixture sign 1400 are concealed behind the finished wall surface, Removal of the electroluminescent inserts 1420 provides complete access to all interior electrical components and junction box wiring terminations of the light fixture sign 1400.

FIG. 15 is a diagram illustrating a side view of the light fixture sign 1400 shown in FIG. 14 according to one embodiment. As shown in FIG. 15, the stencil openings 1410 include stepped recessed edge insets 1502 for accepting the electroluminescent inserts 1420, and maintaining the inserts 1420 therein. The light fixture sign 1400 includes a power supply 1504 that is mounted within the container 1402. The power supply 1504 is electrically connected to a primary power input 1506, and is electrically connected to wires 1412 for providing power to the electroluminescent inserts 1420. The primary power input 1506 provides power from an external power source (e.g., the building mains) to power supply 1504. An emergency power supply provides power for light fixture sign 1400 when power is lost to the building mains.

One embodiment is directed to a concealed light fixture sign, which includes a flange having stencil openings formed therein that define a message, and a container extending from a rear surface of the flange to provide light through the stencil openings. The container is configured to be installed completely within a recess behind a mounting surface with the flange positioned substantially flush with the mounting surface. Translucent inserts are positioned within the stencil openings, wherein the translucent inserts are removable to provide access to an interior of the container after installation of the light fixture sign.

In one form of this embodiment, the message is an EXIT message. The installed light fixture sign according to one embodiment includes no visible fasteners or mounting brackets. The stencil openings may include arrow-shaped stencil openings that are configured to be selectively covered at an installation location with at least one arrow-shaped mask to provide a custom arrow configuration for that installation location. Removal of the translucent inserts may allow removal and replacement of interior electrical components within the container. The flange may be field paintable to match a finish of the mounting surface. The container may include a removable light source that is configured to be removed and replaced from a remote location without direct access to the light fixture sign. The removable light source may comprise a light emitting diode (LED) array contained in a clear plastic tube that is configured to be transported to and from the container via a conduit coupled to the container. The light fixture sign may include a light source that is external to and remote from the container and that delivers light to the container via a fiber optic cable.

Another embodiment is directed to a wall-mountable light fixture sign, which includes a container configured to be installed completely within a recess in a wall, and a self-contained plastic exit sign that includes a light source and a battery pack and that is configured to project an EXIT message. The light fixture sign also includes an exit sign face apparatus that includes a flange and a mounting sleeve extending from a rear surface of the flange, wherein the mounting sleeve is sized to receive the self-contained plastic exit sign therein, wherein the flange includes stencil openings formed therein to allow the EXIT message to pass through the stencil openings, wherein the mounting sleeve is sized to fit within the container, and wherein the flange is configured to be installed substantially flush with the wall.

In one form of this embodiment, the exit sign face apparatus further includes at least one mounting bracket extending from the rear surface of the flange to facilitate mounting the exit sign face apparatus to the container. The at least one mounting bracket may include a slot configured to be slidably attached to a pin contained within an interior of the container. The slot may include an alignment notch to facilitate maintaining the flange in a flush-mounted position. In one embodiment, the installed light fixture sign includes no visible fasteners or mounting brackets. The stencil openings may include arrow-shaped stencil openings that are configured to be selectively covered at an installation location with at least one arrow-shaped mask to provide a custom arrow configuration for that installation location. The flange may be field paintable to match a finish of the wall.

Yet another embodiment is directed to a ceiling-mountable light fixture sign, which includes a container having a top side configured to be mounted to a ceiling, and a front surface having a first set of stencil openings formed therein that define a first EXIT message, wherein the container includes a light source to project light through the stencil openings. The light fixture sign includes a first set of translucent inserts positioned within the stencil openings, wherein the translucent inserts are removable to provide access to an interior of the container after installation of the light fixture sign on the ceiling.

In one form of this embodiment, the container includes a rear surface having a second set of stencil openings formed therein that define a second EXIT message. A second set of translucent inserts may be positioned within the second set of stencil openings, wherein the second set of translucent inserts are removable to provide access to an interior of the container after installation of the light fixture sign on the ceiling. A self-contained plastic exit sign may be positioned within the container, wherein the self-contained plastic exit sign includes the light source.

A further embodiment is directed to a concealed wall-mountable light fixture sign, which includes a container having a front surface with stencil openings formed therein, wherein the container is configured to be installed completely within a recess in a wall with the front surface positioned substantially flush with the wall. The light fixture sign includes electroluminescent inserts positioned within the stencil openings, wherein the electroluminescent inserts are removable to provide access to an interior of the container after installation of the light fixture sign in the wall.

Although some embodiments disclosed herein are directed to light fixture exit signs, the techniques described herein are applicable to any use of electrically illuminated, self-illuminated light fixture signage. Other uses of signage include, but are not limited to, building directional signage, parking ramp, airport signage and medical industry building signage. Embodiments disclosed herein may also be installed in or on a variety of mounting surfaces, including surfaces of walls, floors, ceilings, kiosks, landscape rock/materials, vehicles, as well as other mounting surfaces.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A wall-mountable light fixture sign, comprising:
a container configured to be installed completely within a recess in a wall;
a self-contained plastic exit sign that includes a light source and a battery pack and that is configured to project an EXIT message; and
an exit sign face apparatus that includes a flange and a mounting sleeve extending from a rear surface of the flange, wherein the mounting sleeve is sized to receive the self-contained plastic exit sign therein, wherein the flange includes stencil openings formed therein to allow the EXIT message to pass through the stencil openings, wherein the mounting sleeve is sized to fit within the container, and wherein the flange is configured to be installed substantially flush with the wall.

2. The light fixture sign of claim 1, wherein the exit sign face apparatus further includes at least one mounting bracket extending from the rear surface of the flange to facilitate mounting the exit sign face apparatus to the container.

3. The light fixture sign of claim 2, wherein the at least one mounting bracket includes a slot configured to be slidably attached to a pin contained within an interior of the container.

4. The light fixture sign of claim 3, wherein the slot includes an alignment notch to facilitate maintaining the flange in a flush-mounted position.

5. The light fixture sign of claim 1, wherein the installed light fixture sign includes no visible fasteners or mounting brackets.

6. The light fixture sign of claim 1, wherein the stencil openings include arrow-shaped stencil openings that are configured to be selectively covered at an installation location with at least one arrow-shaped mask to provide a custom arrow configuration for that installation location.

7. The light fixture sign of claim 1, wherein the flange is field paintable to match a finish of the wall.

* * * * *